United States Patent
Cox et al.

[11] Patent Number: 5,264,982
[45] Date of Patent: Nov. 23, 1993

[54] ELECTROMAGNETIC SUPPORT WITH UNILATERAL CONTROL CURRENTS

[75] Inventors: Hendrikus H. M. Cox; Jan Van Eijk, both of Eindhoven, Netherlands

[73] Assignee: U.S. Philips Corporation, New York, N.Y.

[21] Appl. No.: 664,074

[22] Filed: Mar. 4, 1991

[30] Foreign Application Priority Data
Aug. 30, 1990 [NL] Netherlands .......... 9001909

[51] Int. Cl.$^5$ .......................................... H02N 15/00
[52] U.S. Cl. ................................. 361/144; 310/90.5
[58] Field of Search ................. 310/90.5; 324/207.11, 324/207.12, 207.13; 361/139, 143, 144, 146

[56] References Cited
PUBLICATIONS
E. M. H. Kamerbeek, "Magnetic Bearings", Philips Technical Review, vol. 41, No. 11/12, 1983/84, pp. 348-361.

Primary Examiner—Jeffrey A. Gaffin
Attorney, Agent, or Firm—Paul R. Miller

[57] ABSTRACT

A device for positioning a body (5) by means of at least one pair of electromagnets (13, 15). A position sensor (29) measures the size of an air gap (23) between one of the electromagnets (13, 15) and a guide beam (1). An output signal of the position sensor (29) is applied to an electronic control unit (35) which passes a control current through the electromagnets (13, 15) in dependence on a difference between the measured and a desired size of the air gap (23). In one embodiment an electrical switch (53) is connected between the control unit (35) and the two electromagnets (13, 15) controlled by the control unit (35), applying the control current to only one of the two electromagnets (13, 15) in dependence on the polarity of a control signal from the control unit (35). The use of the switch insures that the control current flows through only one of the two electromagnets at a time so that in a simple manner a difference necessary for supporting the body is achieved between the forces exerted on the guide beam (1) by the electromagnets (13, 15). the electrical resistance losses in the electromagnets (13, 15) in such a device are low, the device is eminently suitable for use as an electromagnetic bearing in an optical lithographical device for the irradiation of semiconductor substrates, or in other precision machines.

4 Claims, 5 Drawing Sheets

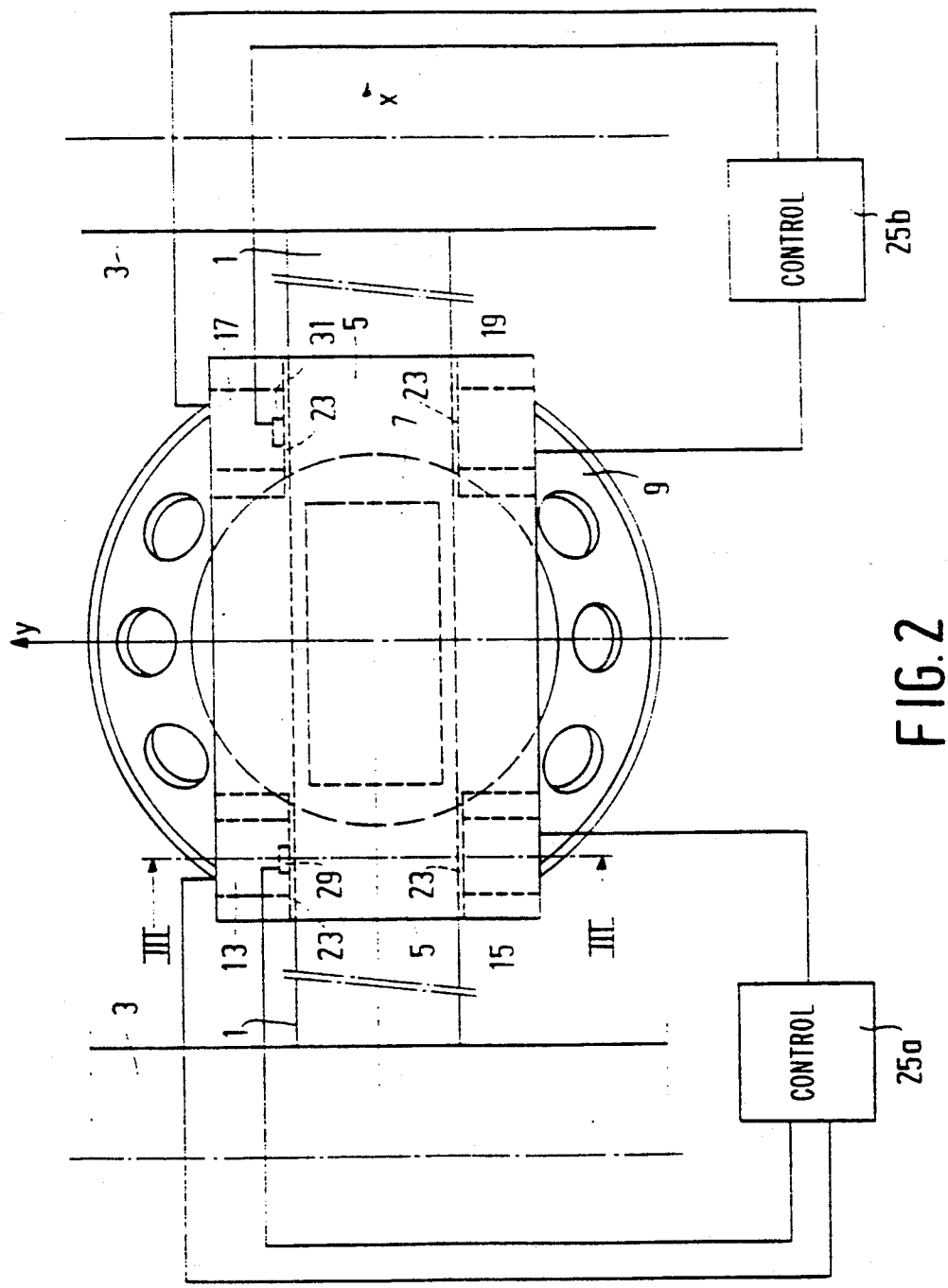

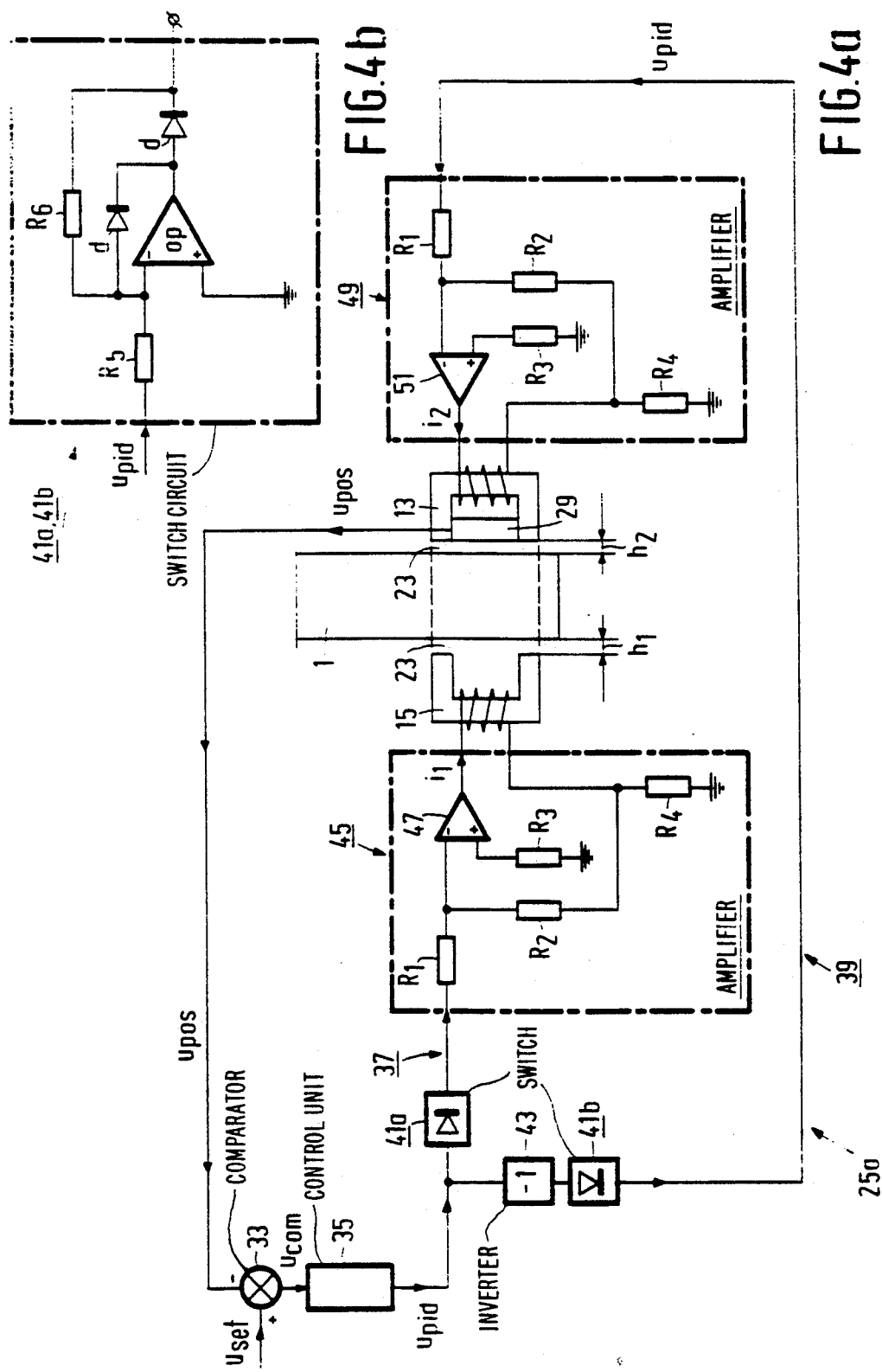

ELECTROMAGNETIC SUPPORT WITH UNILATERAL CONTROL CURRENTS

The invention relates to a device for positioning a body in at least one support direction, the body being supported between a pair of electromagnets which, seen in the support direction, are situated opposite one another, while an electric current in the two electromagnets of the pair is controllable by means of a position sensor and an electronic control unit as a function of a difference between a position of the body relative to the electromagnets as measured by the position sensor and a desired position.

Of interest are commonly owned copending application Ser. No. 664,075 entitled "Electromagnetic Support with Current-Independent Characteristics" in the name of van Eijk et al, and Ser. No. 664,162 entitled "Electromagnetic Support with Position-Independent Characteristics" in the name of Boon et al. both filed concurrently with the instant application.

BACKGROUND OF THE INVENTION

Philips Technical Review, vol. 41, no. 11/12, 1983/84, pp. 348-361, discloses a device of the kind described in the opening paragraph in which a shaft is supported by five pairs of electromagnets in such a way that rotation of the shaft is possible only about the centerline of the shaft. A force exerted on the shaft by an electromagnet is substantially directly proportional to the square of the value of the current through the electromagnet and substantially inversely proportional to the square of the size of an air gap between the electromagnet and the shaft. As a result of the relation between the electromagnetic force and the size of the air gap, the position of the shaft relative to the electromagnets is not stable unless additional measures are taken. To maintain a stable desired position of the shaft in the known device, the position of the shaft relative to each pair of electromagnets is measured by means of a position sensor, and a control current determined from the difference between the measured and the desired position is passed through the two electromagnets of the relevant pair. The value of the control current is thereby determined by means of a control unit having a proportional, differentiating and integrating action PID controller.

The force exerted on the shaft by an electromagnet is always an attracting force, irrespective of the direction of the current through the electromagnet. It is necessary for the electromagnetic forces of the two electromagnets of each pair to be different in value if a support of the shaft is to be obtained by means of the electromagnets. In the known device, an identical basic current is passed through the two electromagnets of each pair for this purpose. The control current is added to the basic current in one of the two electromagnets and subtracted from the basic current in the other electromagnet, so that the forces exerted by the relevant electromagnets are different in value in the case of a change in gap size caused by a loading force. The use of a basic current means that electrical resistance losses arise in the electromagnets caused by this basic current, which leads to heat generation in the electromagnets. This is not acceptable in all circumstances.

SUMMARY OF THE INVENTION

The invention has for its object to provide a device for positioning a body in which a basic current through the electromagnets is dispensed with, so that the electrical resistance losses are small.

The invention is for this purpose characterized in that an electrical switch is connected between the control unit and the two electromagnets controlled by the control unit, which switch admits the current to only one of the electromagnets depending on the polarity of a control signal from the control unit. The use of the electrical switch achieves that the control current, whose value is determined by the control unit, flows through only one of the two electromagnets of the pair, while the other electromagnet receives no current. The polarity of the control signal thereby determines which electromagnet is supplied with the control current and thus exerts a force on the body to be supported and positioned. Since a control current flows through only one of the two electromagnets and a basic current is avoided, the electrical resistance losses of the electromagnets are low.

A particular embodiment of a device according to the invention, which comprises an electrical switch with an accurately defined zero crossing, is characterized in that the electrical switch is a circuit in which between the control unit and each of the electromagnets controlled by the control unit an electronic rectifier is connected which is unique to the relevant electromagnet, the two rectifiers being electrically oppositely directed. An accurate operation of the device is achieved by this.

A further embodiment of a device according to the invention, which has a compact and easily replaceable electrical switch, is characterized in that the electrical switch is a digital control device having a logic switching function.

A yet further embodiment of a device according to the invention, in which a considerable saving is achieved in the number of electrical components required, is characterized in that the electrical switch is a circuit in which between each of the two electromagnets and an amplifier unit controlled by the control unit and common to both electromagnets a diode is connected which is unique to the relevant electromagnet, the two diodes being electrically oppositely directed.

IN THE DRAWING

The invention will be explained in more detail below with reference to the drawing, in which:

FIG. 1 is a lateral elevation of a common portion of a first, a second, and a third embodiment of a device according to the invention, FIG. 2 is a plan view of the common portion according to FIG. 1, FIG. 3 is a cross-section of the common portion taken on the line III—III in FIG. 2, FIG. 4a diagrammatically shows the first embodiment of the device according to the invention comprising a first electronic control circuit, FIG. 4b dramatically shows an electronic rectifier of the kind used in the embodiment of FIG. 4a, FIG. 5 diagrammatically shows the second embodiment of the device according to the invention comprising a second electronic control circuit, and FIG. 6 diagrammatically shows the third embodiment of the device according to the invention comprising a third electronic control circuit.

DESCRIPTION OF THE PREFERRED EMBODIMENT

Figure 1:
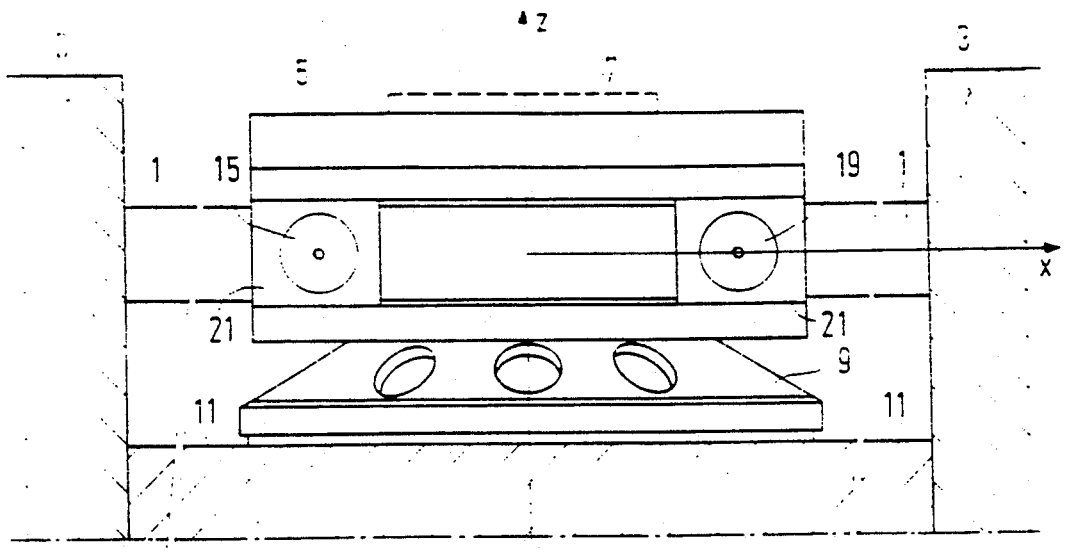
Figure 3:
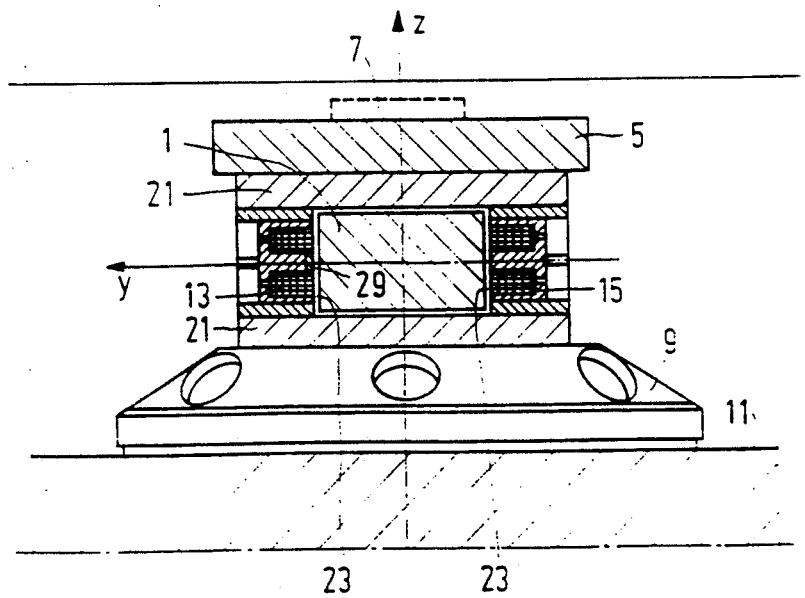

The devices illustrated in FIGS. 1 to 6 comprise a straight guide with a steel guide beam 1 which extends in a horizontal direction parallel to the x-direction in FIG. 1 and which is mounted to a frame 3 near both its ends, a table 5 being displaceable in the x-direction along the guide beam 1. An object 7 (shown in dashed lines) fastened to the table 5 can be positioned in the x-direction by driving means not shown in any detail in the FIGS. 1 to 3.

The table 5 is provided with a round, aerostatically supported foot 9 of a kind known from Netherlands Patent Application 8902472 which corresponds to commonly owned copending application Ser. No. 594,519 filed Oct. 4, 1990 in the name of Engelen et al. Of further interest is commonly owned U.S. Pat. No. 4,737,823. During operation, the foot 9 has its support on a granite base surface 11 by means of a static gas bearing of a type known per se pretensioned with an underpressure, which base surface 11 extends in a horizontal plane parallel to the x-direction and in a horizontal y-direction which is perpendicular to the x-direction (see FIG. 2). The use of the aerostatically supported foot 9 in combination with the base surface 11 prevents a translation of the table 5 in a z-direction perpendicular to the base surface 1 1 as well as a rotation of the table 5 about an axis of rotation which extends parallel to the x-direction or y-direction.

A translation of the table 5 parallel to the y-direction and a rotation of the table 5 about an axis of rotation parallel to the z-direction are prevented through the use of two pairs of electromagnets (13, 15) and (17, 19), these two pairs being fastened at some distance from one another in a bearing block 21 provided between the table 5 and the foot 9 and surrounding the guide beam I (see FIGS. 1 and 2). As can be seen in FIG. 2, the two electromagnets (13, 15) and (17, 19) of each pair are situated opposite one another on either side of the guide beam 1, seen in the y-direction.

When an electric current is passed through the electromagnets 13, 15, 17, 19, each of the electromagnets 13, 15, 17, 19 will exert an attracting electromagnetic force on the steel guide beam 1. The extent of this force is substantially directly proportional to the square of the value of the current through the relevant electromagnet 13, 15, 17, 19, and substantially inversely proportional to the square of the size of an air gap 23 between the relevant electromagnet 13, 15, 17, 19 (see FIG. 2) and the guide beam 1. As a result of the relation between the electromagnetic force and the size of the air gap 23, an equilibrium condition, in which the attracting forces of the two electromagnets of each pair (13, 15) and (17, 19) are equal, will be unstable if the current through the electromagnets 13, 15, 17, 19 is a constant, non-controlled current. For, if the table 5 is displaced from the equilibrium position over a small distance parallel to the y-direction, the attracting forces of the electromagnets whose air gaps 23 are made smaller by the displacement will increase and the attracting forces of the electromagnets whose air gaps 23 are made wider by the displacement will decrease. A resultant force in the direction of the displacement follows, so that the displacement will be further increased.

In order to obtain a stable support in the y-direction, the current through the electromagnets of the pairs (13, 15) and (17, 19) is controlled by means of respective electronic control circuits 25a and 25b (see FIG. 2). The control circuits 25a and 25b are identical. Each of the two pairs of electromagnets (13, 15) and (17, 19) is provided with a contactless capacitive position sensor 29, 31 of a kind known per se which is fitted in one of the two electromagnets of the relevant pair (13, 15), (17, 19) (see FIG. 2). During operation, each of the position sensors 29, 31 measures the size of the air gap 23 between the guide beam 1 and the electromagnet 13, 17 in which the relevant position sensor 29, 31 is fitted. The control circuits 25a, 25b compare the measured sizes of the two air gaps 23 with a desired size and pass control currents through the electromagnets 13, 15, 17, 19 whose values depend on the difference between the desired and the measured sizes, so that the measured size becomes equal to the desired size under the influence of the electromagnetic forces exerted on the guide beam 1. The operation and characteristics of the control circuits 25a, 25b will be further explained below.

FIG. 4a diagrammatically shows a first embodiment of the electronic control circuit 25a circuit 259 being representative. An electrical output of the relevant position sensor 29, 31 in each control circuit 25a, 25b is connected to a first electrical input of a summation circuit which acts as a comparator 33. An output signal $u_{pos}$ (voltage signal) of the position sensor 29, 31, the value of which depends on the size of the air gap 23, is compared by the comparator 33 with an input signal $u_{set}$ of a second electrical input of the comparator 33, the value of which depends on the desired size of the air gap 23. An output signal $u_{com}$ of the comparator 33 is equal to the difference $u_{set} - u_{pos}$ of the two input signals of the comparator 33. The signal $u_{com}$ forms an input signal for an electronic control unit 35. The control unit 35 is a PID controller which is known per se and which is of a usual type having a proportional, integrating and differentiating control action, transforming the signal $u_{com}$ into a control signal $u_{pid}$ (voltage signal) which determines the value of the control current through the electromagnets 13 and 15.

As is shown in FIG. 4a, an electrical output of the control unit 35 is connected to the electromagnet 15 via a first branch 37 of the control circuit 25 and to the electromagnet 13 via a second branch 39 of the control circuit 25. The branch 37 comprises an electronic rectifier 41a, while the branch 39 comprises an electronic rectifier 41b and an inverter 43 which inverts the polarity of the signal $u_{pid}$ in the branch 39. The rectifiers 41a and 41b, which both operate as ideal diodes, are of a conventional type and are each constructed as an operational amplifier circuit with a half-wave rectifier action (see FIG. 4b). It is not possible to use a single diode instead of each of the rectifiers 41a, 41b, because the threshold voltage of such a diode is too great in relation to the voltage signal till. The use of the rectifiers 41a, 41b of FIG. 4b achieves an ideal diode function with an accurate zero crossing. The use of the inverter 43 furthermore achieves that the rectifiers 41a and 41b are oppositely directed relative to the signal $u_{pid}$, as is diagrammatically shown in FIG. 4a. The functions of the rectifiers 41a, 41b in the control circuit 25a is further explained below.

FIG. 4a also shows that the output of the control unit 35 is connected to an amplifier unit 45 of a conventional type, which is provided with an operational amplifier 47, via the rectifier 41a in branch 37. The amplifier unit 45 amplifies the voltage signal $u_{pid}$ to a control current $i_1$ through the electromagnet 15. Furthermore, the output of the control unit 35 is connected to an amplifier unit 49, which is of a type similar to that of the amplifier unit 45 and which is provided with an operational amplifier 51, via the rectifier 41b in branch 39. The voltage signal $u_{pid}$ is amplified to a control current $i_2$ through the electromagnet 13 by the amplifier unit 49.

The control circuit 25a (and 25b) shown in FIG. 4a only passes control currents $i_1$ and $i_2$ through the electromagnets 13, 15, 17, 19. A basic current, as is used in the known device described in the opening paragraph, is not used in the device shown in FIG. 4a. Such a control without basic current is possible through the use of the rectifiers 41a, 41b and the inverter 43 in the control circuit 25a (and circuit 25b). The inclusion of the rectifiers 41a, 41b and the inverter 43 in the control circuits 25a, 25b in the manner shown in FIG. 4a achieves that, in the case of a static load on the table 5, electromagnet 13 only is supplied with a control current $i_2$, while $i_1$ is zero, when the measured size of the air gap 23 is greater than the desired size. With such a load, the electromagnet 15 only is supplied with a control current $i_1$, while $i_2$ is zero, when the measured size of the air gap 23 is smaller than the desired size. Thus the rectifiers 41a, 41b in conjunction with the inverter 43 act as an electrical switch which admits the control current to only one of the two electromagnets 13, 15. The polarity of the signal $u_{pid}$ thereby determines which of the two electromagnets 13, 15 is supplied with the control current and consequently exerts a force on the guide beam 1, so that a difference between the forces exerted by the electromagnets 13, 15 is obtained at all times.

Since a basic current through the electromagnets 13, 15 is absent, and only one of the electromagnets 13, 15 receives a control current, the electrical resistance losses of the electromagnets 13, 15 are low. The resistance losses in a no-load condition of the table 5 are indeed so low as to be negligible.

Figure 5:
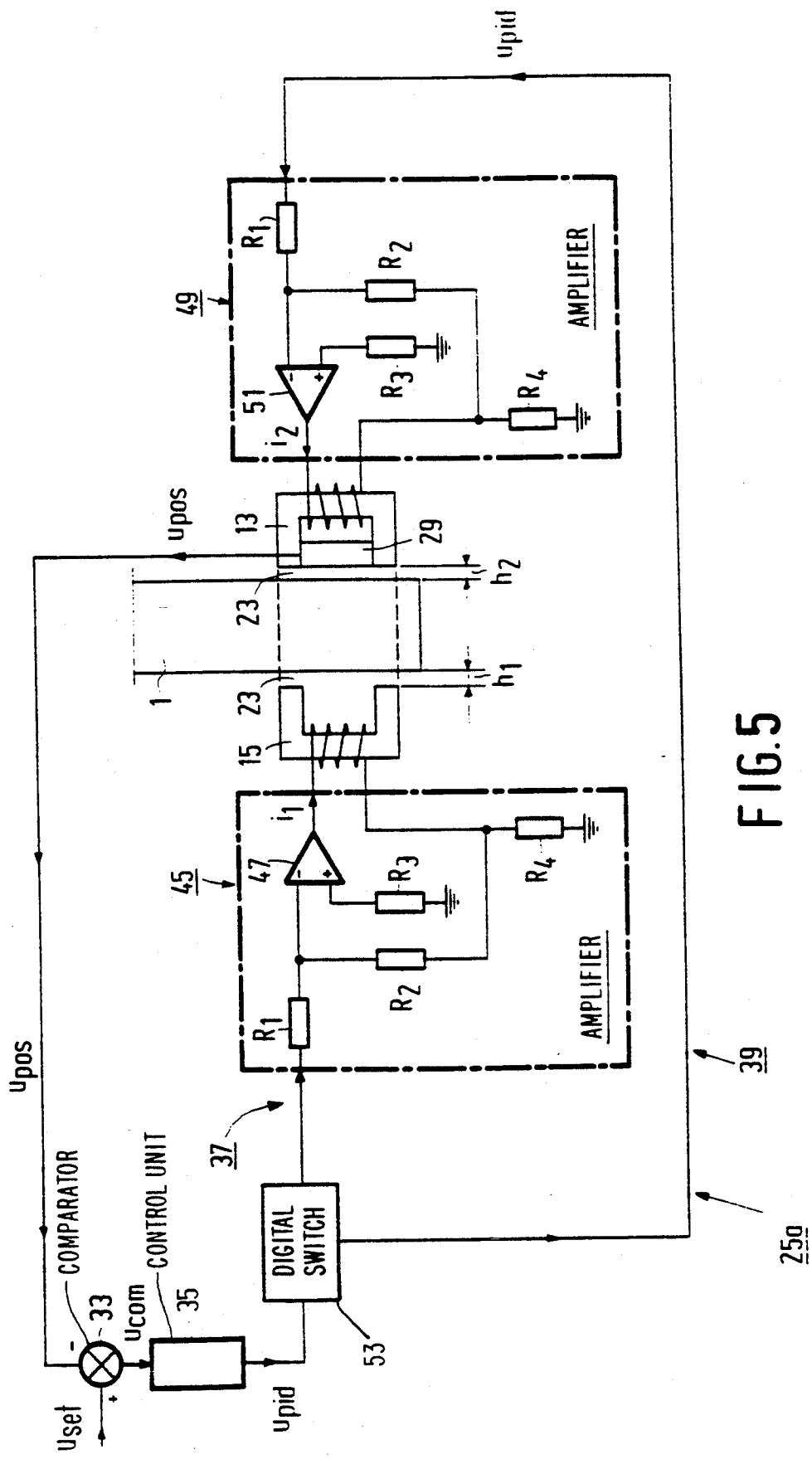

FIG. 5 diagrammatically shows a second embodiment of the control circuit 25a, 25b. In this embodiment, a digital switch mechanism 53 with a logic switching function is used as the switching mechanism instead of the rectifiers 41a, 41b and the inverter 43 used in the embodiment shown in FIG. 4a. Besides a saving in the number of components in the control circuits 25a, 25b, a simple and fast exchangeability of the components is also achieved by this.

Figure 6:
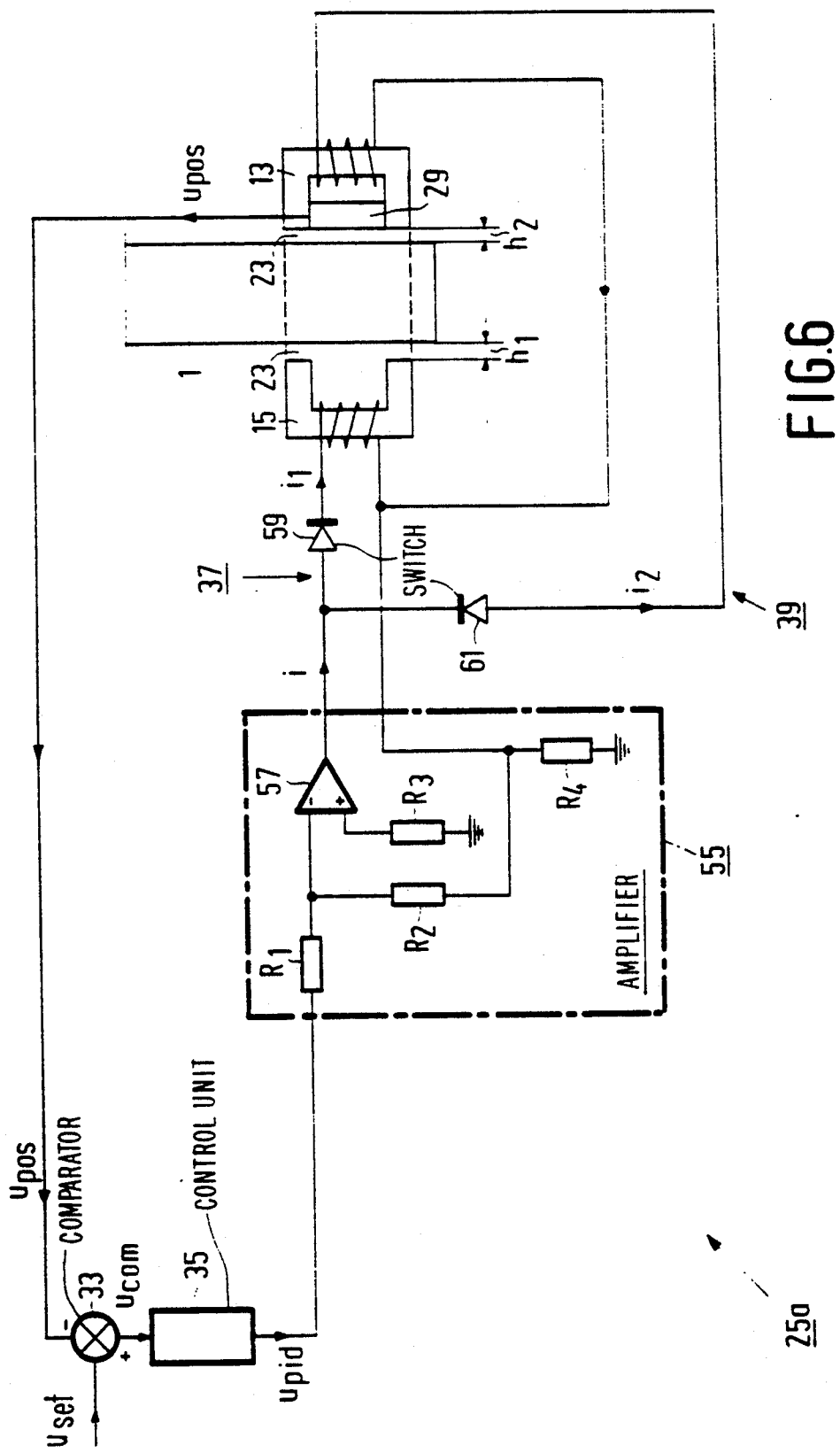

FIG. 6 diagrammatically shows a third embodiment of the control circuits 25a, 25b. Only one amplifier unit 55 is used in this embodiment which is common to both electromagnets 13, 15. The amplifier unit 55 is of the same type as the amplifier units 45, 49 used for the embodiments of FIGS. 4a and 5 and is provided with an operational amplifier 57. Diodes 59 and 61 are included in the branches 37 and 39, respectively. The diodes 59, 61 are electrically oppositely directed relative to the control current i, so that the control current is admitted to only one of the electromagnets 13, 15 in dependence on the direction of the control current. This acts as the switching mechanism. The use of the diodes 59, 61 is possible in this embodiment because an output voltage of the amplifier unit 55 is great in proportion to the threshold voltage of the diodes 59, 61.

It should be noted that the device described above is eminently suitable for application as an electromagnetic bearing in an optical lithographical positioning device for the manufacture of masks to be used in the production of integrated circuits. Dimensional inaccuracies can arise in such positioning devices, and also in other precision machines having electromagnetic bearings, as a result of heat generation in the electromagnets. Such inaccuracies can be avoided through the use of a device according to FIG. 4a, 5 or 6.

It should further be noted that a digital control unit, in which the functions of the control unit 35 and the digital switch mechanism 53 are combined, may be used instead of this control unit 35 and the digital switch unit 53 in the embodiment shown in FIG. 5.

It should also be noted that owing to the quadratic relation between the electromagnetic force and the current the device has zero stiffness in a no-load condition of the table 5. The result of this is that in the no-load condition the table 5 may exhibit a slight vibration (a few tenths of a micrometer). In many applications, however, this vibration is not disadvantageous, the more so since the amplitude and the frequency of the vibration can be determined in a design stage.

Finally, it is noted that two degrees of freedom of the table 5 are suppressed by means of two pairs of electromagnets (13, 15) and (17, 19) in the devices according to FIGS. 1 to 6, that is a translation parallel to the y-direction and a rotation about an axis extending parallel to the z-direction. If more pairs of electromagnets are used in such a device, it is obvious that more than two degrees of freedom of the body to be supported can also be suppressed. In the devices according to FIGS. 1 to 6, the electromagnets 13, 15 are provided facing one another on either side of the guide beam 1. The electromagnets of a pair may obviously also be otherwise positioned, i.e. with the U-shaped sides facing away from one another. In the latter case the pair 13, 15 is positioned between a first and a second part of the guide beam, the two parts being parallel.

What is claimed is:

1. A device for positioning a body in at least one support direction relative to a support comprising:
   a body;
   at least one pair of electromagnets for positioning the body relative to said support;
   at least one position sensor for producing an output signal whose value manifests the position of said body relative to said support; and
   electronic control means for said at least one pair of electromagnets including 1) a control unit responsive to said output signal applied thereto for generating an electric current output control signal at a control unit output as a function of the difference between said output signal value and a reference value for said position, said control signal having a certain polarity, and 2) switch means coupled to said control unit and to at least one of said electromagnets of said at least one pair of electromagnets responsive to said control signal for selectively applying said generating electric current control signal to a different one of said electromagnets of said at least one pair of electromagnets in accordance with the polarity of said control signal.

2. The device of claim 1 including an amplifier and first and second diodes, said control signal being applied to one of said at least one pair of electromagnets via said amplifier and the first diode and to the other of said at least one pair of electromagnets via said amplifier and the second diode, said diodes being coupled to the amplifier in electrically opposite relation.

3. A device as claimed in claim 1, wherein the switch means comprises a circuit in which between the control unit and each of the electromagnets controlled by the control unit an electronic rectifier is connected which is unique to the relevant electromagnet to which that rectifier is connected, the two rectifiers being electrically oppositely connected.

4. A device as claimed in claim 1, wherein the switch means comprises a digital control device having a logic switching function.

* * * * *